United States Patent [19]
Dullien et al.

[11] Patent Number: 4,950,313
[45] Date of Patent: Aug. 21, 1990

[54] FINE DUST REMOVAL DEVICE

[75] Inventors: Francis A. L. Dullien, Kitchener; Donald R. Spink, Waterloo; Wendy Mortimer, Toronto, all of Canada

[73] Assignee: University of Waterloo, Waterloo, Canada

[21] Appl. No.: 293,523

[22] Filed: Jan. 5, 1989

[30] Foreign Application Priority Data

Jan. 5, 1988 [GB] United Kingdom ................ 8800101

[51] Int. Cl.$^5$ ............................................. B01D 46/12
[52] U.S. Cl. ......................................... 55/97; 55/485; 55/DIG. 25
[58] Field of Search ............... 55/1, 97, DIG. 25, 486, 55/485

[56] References Cited

U.S. PATENT DOCUMENTS

| | | | |
|---|---|---|---|
| 764,922 | 7/1904 | Davis | 55/485 |
| 1,094,521 | 4/1914 | Brauer | 55/485 |
| 1,500,128 | 7/1924 | Harrison | 55/496 |
| 1,532,730 | 4/1925 | Chalupa et al. | 55/418 |
| 2,673,620 | 3/1954 | Montgomery | 55/304 |
| 2,829,735 | 4/1958 | Kroll | 55/485 |

Primary Examiner—Bernard Nozick
Attorney, Agent, or Firm—Sim & McBurney

[57] ABSTRACT

Particulates in the form of fine dust are removed from gas streams by impinging the particles on screens located in the path of the particles to result in the build up of a deposit on the mesh, until the deposits grow to a sufficient size that the combined effect of gravity and gas flow dislodges the deposits, which are collected.

11 Claims, 1 Drawing Sheet

FINE DUST REMOVAL DEVICE

FIELD OF INVENTION

The present invention relates to the removal of very fine dust particles from industrial gases.

BACKGROUND TO THE INVENTION

The removal of very fine dust, typically in the particle size range of about 0.3 to 20 microns, from industrial gases is a difficult and expensive operation to perform efficiently. Devises traditionally employed for this purpose involve electrostatic precipitation, bag houses and wet scrubbers. Larger particles are removed mostly by cyclone separators and gravity settlers.

Gravity settlers are among the least expensive air pollution control equipment but are effective usually only for the removal of particles having a particle size greater than 50 microns, then they can be removed by simple gravity separation.

A search conducted in the facilities of the U.S. Patent and Trademarks Office has located the following U.S. Patents as the most relevant:

| | | |
|---|---|---|
| 1,094,521 | 1,500,128 | 1,532,730 |
| 2,673,620 | 2,829,735 | |

All there prior patents show the provision of some form of filter for the removal of dust particles from gas streams.

SUMMARY OF INVENTION

The present invention removes fine particulates from gas streams, usually air-borne dust, in a unique and efficient manner. In the present invention, the gas stream is conveyed through a dust agglomeration zone wherein are located a plurality of parallel mesh screens closely spaced apart one from another and each formed of criss-crossing elongate strands.

The particulates are impinged on the upstream side of the elongate strands of successive ones of the plurality of screens to form a deposit on the strands of a growing size as successive impingements of particulates occurs. The deposits are dislodged from the strands as they become sufficiently large to permit such dislodgement to occur by the joint action of gravitational forces and the flow velocity of the gas stream. The dislodged deposits are collected.

Accordingly, in the present invention, agglomeration of very fine dust particles, generally of particle diameter of about 0.3 to about 20 microns, is effected in line and in continuous manner. The dust agglomerates so produced, which generally have a diameter from about 20 to about 1000 microns, are efficiently and continuously collected, such as in a settling chamber integral with the dust agglomerator.

GENERAL DESCRIPTION OF INVENTION

Figure 1:
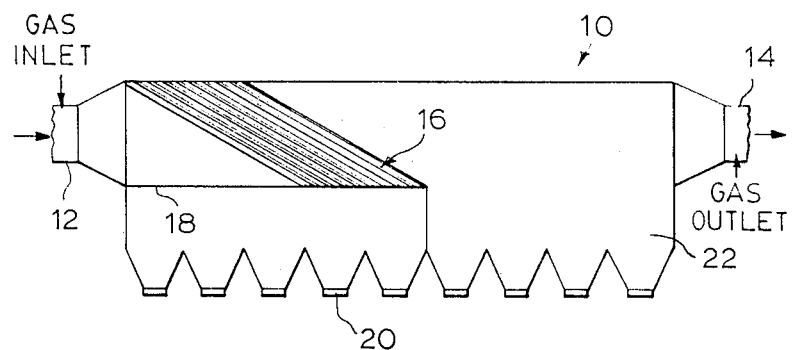
FIG. 1 is a schematic representation of a dust agglomerator and removal device in accordance with one embodiment of the invention.

The dust agglomerator employed in the present invention may comprise a series of mesh screens positioned one behind the other in a gas-carrying housing and spaced apart a suitable distance, generally about 0.4 to about 2.0 cm, preferably about 0.5 to about 1.5 cm, and occupying the entire cross-section of the housing. Such mesh screens are provided with a criss-cross pattern of elongate strand-like elements which define a plurality of particle-impacting surfaces and openings through which the gas may pass. The particle-impacting surfaces generally have a diameter from about 0.1 to about 2 mm, preferably about 0.5 to about 1 mm. The screen openings generally have a mesh size from about 2 to about 20 mm, preferably about 4 to about 8 mm.

The fine particulate material or dust is carried by the gas stream, usually an air stream, generally at relatively high velocities, generally in the range of about 1 to about 15 m/s, preferably about 5 to about 10 m/s, and is brought into contact with the set of screens. The dust particles strike the upstream side of the elongate strands, which may be in the form of the wires, fibres, filaments etc., of which the screen is made, and forms a deposit of increasing size, which may reach a diameter several times the thickness of the wires, before the deposit is broken up and removed from the strands by the joint action of gravity and the drag force exerted on the deposit by the air stream. The dust in the deposited form is agglomerated and does not readily redisperse into its elementary dust particles when it is removed from the strands.

The agglomerate chunks of dust which are formed by the breaking up the dust deposits, fly off at an angle to the axis of the housing and either strike another screen or fall to the bottom of the screen housing. The agglomerates which strike another screen are partly broken up into smaller particles and partly block the meshes of the screen. Those agglomerates, however, that fall to the bottom of the housing can be discharged from the housing into hoppers or the like by providing a false bottom to the housing, which is opened from time-to-time to remove the accumulated agglomerates.

It is preferred t position the screen to favour collection of agglomerates rather than redispersion of dust. In one embodiment of the present invention, therefore, the screens are arranged at a sharp angle relative to a horizontal axis of the housing and approximately equal to the dominant angle of fall of the agglomerates, generally about 10 to about 60 degrees, preferably about 15 to about 25 degrees.

The angles of fall of the agglomerates cover a range of values that is progressively narrowed as the direction of air flow approaches the direction of pull of gravity, i.e. vertically downwardly. In a preferred embodiment of the invention, advantage is taken of this fact to achieve more efficient dust removal by providing the axis of the screen housing at a sharp angle relative to the vertical, generally about 10 to about 60 degrees, preferably about 15 to about 25 degrees, and the screens standing vertically in the screen housing. With this arrangement, all the agglomerates fall nearly vertically and hence nearly parallel to the screens and impingement of removed agglomerates on the screens is minimized, thereby minimizing redispersal of dust and clogging of the screens.

Removal of the deposited agglomerates from the bottom of the housing may be assisted by a vibrator attached to the outside of the housing or located inside the housing. Discharge of the agglomerates from the housing can be effected by very rapidly opening and closing a discharge opening, in only a few seconds, so that the air stream need not be shut off or diverted during this operation, so that truly continuous operation results.

DESCRIPTION OF PREFERRED EMBODIMENTS

Referring first to FIG. 1, a dust agglomerator and removal device 10 comprises an inlet 12 for gas laden with fine dust and an outlet 14 for dust-free gas, typically air. In this embodiment, the inlet 12 and outlet 14 are arranged on a generally horizontal axis. A set of closely-spaced dust agglomerating screens 16 is provided at a sharp angle to the horizontal axis. Dust agglomerates formed on the screens 16 and subsequently removed therefrom by the flow of gas and the effect of gravity, pass through a louvered bottom wall 18 into dust collecting hoppers 20.

The dust agglomerator is integrated with a settling chamber 22 where the agglomerates crossing or leaving the last screen of the set 16 are collected by gravity action. In addition, coarse particles present in the air stream and which do not form agglomerates also are removed in the settling chamber 22.

Figure 2:
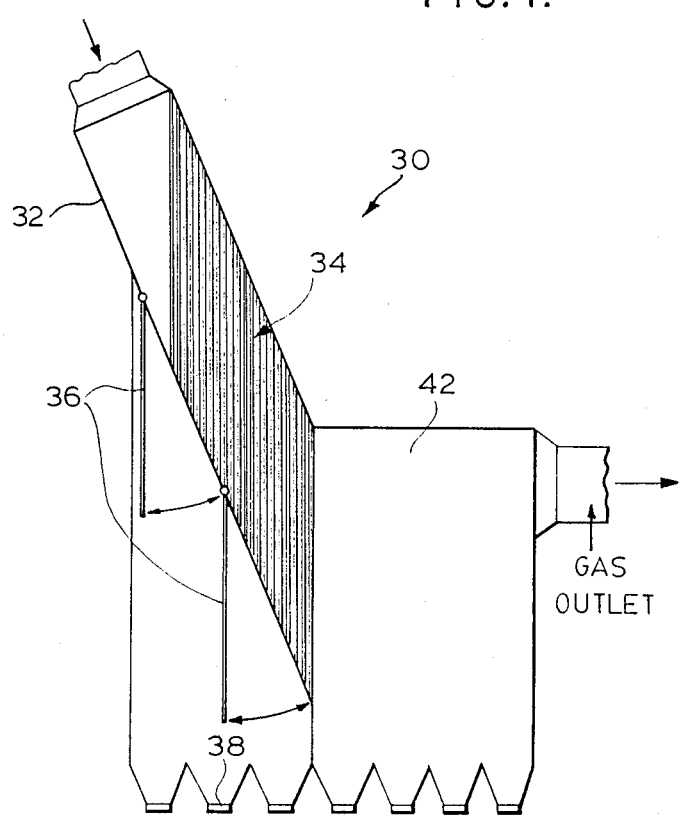
FIG. 2 is a schematic representation of a dust agglomerator and removal device in accordance with another embodiment of the invention.

In the embodiment of FIG. 2, a dust agglomerator and removal device 30 comprises an inlet pipe 32 arranged at a sharp angle to the vertical and a set of screens 34 arranged vertically in the pipe 32. The bottom wall 36 of the pipe 32 is provided in the form of hinged doors which permit agglomerates to be discharged to dust collecting hoppers 38. A gas outlet 40 is provided for the discharge of dust-free air from the device 30.

The dust agglomerator is integral with a settling chamber 42 for collection of agglomerates crossing or leaving the last screen of the set 34 by gravity and by the inertia of transportation downwards by the air stream. Coarse particles also are removed in chamber 42.

The screens 16 and 34 may be constructed of any convenient material, including various metals and fiberglass, and may be made to withstand wide ranges of temperature, including very hot gases.

The wires, fibres, filaments etc. of which the screens 16 and 34 are made, may have any diameters but the best results have been obtained using materials with diameters less than about 1 mm. The mesh size also may vary widely but is usually less than about 1 cm, since higher values do not provide a sufficient target area per unit screen surface for effective capture of the dust particles.

The number of screens present in a set of screens 16 and 34 varies according to the type of dust to be removed from the gas stream and, depending on the desired removal efficiency, between about 40 and about 400, preferably between about 100 and about 200. Increasing the number of screens has resulted in increased dust removal efficiency in every case.

The screens 16 and 34 may be mounted in their respective housings in a variety of different manners. One preferred method comprises providing two rows of parallel rods mounted in the screen housing, perpendicular to the direction of air flow, with one row at the top and the other at the bottom of the housing, and the rods spaced about 1 to 2 cm apart. The screen then is threaded alternately over a rod at the top and under another at the bottom.

The formation of stable agglomerates from the dust particles may be aided by humidification of the gas carrying the dust to high relative humidities but generally above the dew point to avoid condensation of moisture.

EXAMPLES

Example 1:

A device constructed as illustrated in FIG. 1 and having 80 screens spaced apart 1 cm in a 2-meter horizontal length of housing was tested for its efficiency in removing fly ash particulates from the exhaust gas stream from a coal-fired electrically-generating plant. The filter face dimensions were 15 cm wide by 30 cm high. Each filter element was formed of fiberglass mesh ($\frac{1}{4}$ in $\times \frac{1}{4}$ in) and was located at an angle of about 30° to the horizontal.

The floor of the filter housing consists of hinged flappers which may be opened to allow accumulated dust to fall into three hoppers located below the pipe.

The coal burned during the test was Eastern U.S. Bituminous having a total sulphur content of 1.65%. The coal was treated with limestone slurry (40% by weight solids) to provide a Ca:S ratio of 2.5:1 and was fed to the burner at a feed rate of 13.5 kg/h. The inlet gas to the filter was at a temperature of about 140° to 145° F. and the pressure drop across the filter after two to three hours running time was 8.5 cm $H_2O$, final reading, with a gas flow rate of about 0.10 m$^3$/s.

Inlet and outlet particulate samples were taken simultaneously using standard procedures. Single center-line samples were taken isokinetically and each test was run for 15 to 20 minutes. During a 3-hour test period, the pressure drop across the filter showed a slow and steady increase with time. The final pressure drop was 8.5 cm $H_2O$.

The result obtained is set forth in the following Table I:

TABLE I

TEST RESULT USING EASTERN U.S. COAL

| Conditions | Inlet Concentration (g/m$^3$) $C_i$ | Outlet Concentration (g/m$^3$) $C_o$ | Efficiency 100($C_o$) $C_i$ |
|---|---|---|---|
| Coal & Slurry | 3.708 | 0.587 | 84.2% |

Example 2:

The procedure of Example 1 was repeated but employing coal from Nova Scotia with a 2.7% sulphur content, which was treated with a limestone slurry to provide a Ca:S ratio of about 3:1.

Simultaneous inlet and outlet sampling was carried out for the coal only (two runs) and for the coal-slurry combination (four runs). Each run lasted 10 minutes. The flow rate was about 0.08 m$^3$/s and the pressure drop was relatively constant at about 3 cm $H_2O$.

The results obtained are reproduced in the following Table 2:

TABLE 2
TEST RESULTS USING NOVA SCOTIA COAL

| Conditions | Inlet Concentration (g/m³) Ci | Outlet Concentration (g/m³) Co | Efficiency 100(Co) Ci |
|---|---|---|---|
| Coal only | 2.026 | 0.159 | 92.16% |
| Coal only | 2.436 | 0.155 | 93.66% |
| Coal & slurry | 9.595 | 0.385 | 95.99% |
| Coal & slurry | 9.048 | 0.385 | 95.75% |
| Coal & slurry | 8.575 | 0.386 | 95.49% |
| Coal & slurry | 6.142 | 0.402 | 93.46% | coal only and coal-slurry combination. As may be seen, as the inlet concentration increases, the efficiency of removal increase, although this effect appears to level off at about 10 g/m³.

Example 3:

Further experiments were carried out using different materials and screens, as shown in the data set forth in the following table:

TABLE 3
TEST RESULTS ON "FILTER FLOUR" FROM MAPLE LEAF MILLS

| Air Velocity m/sec | Dust Loading g/m³ | Time mins. | Pressure Drop Across Box cm/H₂O | 41 Metal Screens 25° angle Efficiency % |
|---|---|---|---|---|
| 6.09 | 2.9 | 0–5 | 1.0 | 95.1 |
|  |  | 18–23 | 1.0 | 94.4 |
|  |  | 32–37 | 1.0 | 95.1 |
| 3.62 | 3.6 | 0–5 | 0.4 | 96.7 |
| 7.78 | 3.0 |  | 1.0 | 77.0 |
| 5.70 | 5.0 | 0–5 | 1.0 | 95.4 |
|  |  | 25–30 | 1.0 | 95.1 |
| 5.70 | 2.4 | 0–5 | 1.0 | 97.8 |
|  | 2.5 | 25–30 | 1.1 | 92.9 |
|  | 2.8 | 55–65 | 1.5 | 92.3 |
|  | 3.3 | 85–95 | 1.9 | 92.6 |

Note:
Dust coats duct walls.
Flour provided agglomerates easily and builds up well on screens.
Some bran-type particles pass through screens but are collected in box beyond.

Example 4:

Further experiments were carried out which provided the following data:

TABLE 4
ASP100 DUST TEST RESULTS ON FIBERGLASS SCREENS (30° angle)
(Aluminum silicate pigment)

| Comments - changes etc. | Air Velocity m/sec | Dust Loading g/m³ | Time mins. | Pressure Drop cm/H₂O | Efficiency % |
|---|---|---|---|---|---|
| 100 Screens (4 mm opening mesh) | 5.9 | 4.3 | 15–20 | 3.0–4.5 | 84.2 |
|  |  | 5.2 | 10–45 | 5.0–5.6 | 79.3 |
|  |  | 5.3 | 0–5 | 3.2–4.6 | 86.4 |
|  |  | 5.0 | 30–40 | 4.8–5.6 | 84.7 |
|  | 7.7 | 2.8 | 0–5 | 7.0–7.2 | 83.4 |
|  |  | 4.5 | 30–40 | 8.0–8.8 | 84.7 |
|  |  | 4.7 | 50–60 | 9.4–10.6 | 83.9 |
| 88 Screens (2 mm opening mesh) | 5.9 | 4.9 | 0–10 | 2.4–5.0 | 85.8 |
|  |  | 7.5 | 30–40 | 7.6–9.2 | 85.5 |
|  |  | 11.8 | 60–70 | 11.4–12.2 | 85.7 |
|  | 5.9 | 4.5 | 0–10 | 3.8 | 82.5 |
|  |  | 4.8 | 25–35 | 9.8 | 81.9 |
|  |  | 4.8 | 5–15 | 6.0–7.8 | 85.2 |
| 188 Screens | 5.7 | 4.1 | 0–5 | 5.4–7.2 | 92.0 |
|  |  | 4.1 | 25–35 | 8.0–8.6 | 92.0 |
|  |  | 5.3 | 0–10 | 8.6–10.2 | 92.0 |
|  |  | 5.9 | 30–40 | 11.6–12.2 | 88.4 |
|  | 7.9 | 3.6 | 0–5 | 12.6–13.8 | 91.0 |
|  |  | 5.1 | 35–45 | 15.0–15.6 | 90.0 |
|  | 5.9 | 4.3 | 0–5 | 8.4–8.8 | 91.8 |
|  |  | 4.7 | 5–10 | 8.8–9.4 | 90.4 |
|  |  | 4.6 | 10–15 | 9.4–10.0 | 91.8 |
|  | 7.9 | 3.3 | 0–5 | 15.0 cm | 94.6 |
|  |  | 3.2 | 0–5 | 14.8–15.0 | 93.0 |
|  |  | 2.9 | 5–15 | 15.0–15.8 | 92.3 |
|  |  | 3.2 | 15–25 | 15.8–16.4 | 92.0 |
| 188 Screens Lower Dust Loading | 5.9 | 1.2 | 0–10 | 9.4–10.0 | 86.9 |
|  |  | 1.1 | 10–20 | 10.0–10.2 | 88.0 |
|  |  | 1.2 | 20–30 | 10.2–10.4 | 88.9 |
| 210 Screens | 5.9 | 4.7 | 0–10 | 7.0–7.8 | 93.3 |
|  |  | 4.6 | 20–30 | 8.4–8.6 | 92.0 |
|  |  | 5.0 | 30–40 | 8.6 | 91.3 |
|  | 5.9 | 5.1 | 0–10 | 4.4–6.2 | 92.6 |
|  |  | 4.9 | 10–20 | 6.2–7.0 | 94.5 |
| 188 Screens | 4.1 | 5.8 | 0–10 | 3.0–4.4 | 90.7 |
|  |  | 6.8 | 10–20 | 4.4–4.5 | 92.0 |
|  | 5.9 | 5.7 | 0–10 | 5.8–7.0 | 94.4 |
|  |  | 5.6 | 10–20 | 7.0–8.0 | 95.4 |
|  | 8.1 | 3.3 | 0–10 | 13.0–14.4 | 93.4 |
|  |  | 3.3 | 10–20 | 14.6–15.0 | 94.3 |

As may be seen by comparing the date provided in Tables 3 and 4 above, the following conclusions can be drawn:

1. The mesh particle size of ASP100 was 1.7 m.
2. The metal screens permit operation at mush lower pressure drops than the fiberglass screens.
3. With the metal screens there is less clogging than with the fiberglass screens.
4. Both int metal screens and the fiberglass screens result in very high removal efficiencies.
5. Increasing number of screens leads to higher dust removal efficiencies.

SUMMARY OF DISCLOSURE

In summary of this disclosure, the present invention provides a novel and inexpensive manner of removal of fine particulate dust from gas steams in a continuous in-line procedure involving agglomeration of the fine particles and gravity settling of the agglomerates. Modifications are possible within the scope of the invention.

What We claim is:

1. A method of removing particulates having a diameter of from about 0.3 to about 20 microns from a gas stream containing the same, which comprises:
   conveying said gas stream at a velocity of about 1 to about 15 m/s through a dust agglomeration zone wherein are located about 40 to about 400 parallel mesh screens closely spaced apart from one another, each of said screens being formed of a crisscrossing pattern of elongate strands having a diameter of about 0.1 to about 2 mm and being spaced apart to define openings sized from about 2 to about 20 mm, said screens being angled with respect to the axis of flow of the gas stream at an angle of about 10 to about 60 degrees.
   impinging said particulates on the upstream side of the elongate strands of successive ones of said screens to form a deposit on said strands of a growing size as successive impingements occur,
   dislodging said deposits from said strands as they become sufficiently large to permit such dislodgement to occur by the joint action of gravitational forces and the flow velocity of the gas stream, and collecting the dislodged deposits.

2. The method of claim 1 wherein said strands have a diameter of about 0.5 to about 1 mm and are spaced apart to define openings sized from about 4 to about 8 mm.

3. The method of claim 1 wherein said velocity is about 5 to about 10 m/s.

4. The method of claim 1 wherein there are about 100 to about 200 screens.

5. The method of claim 1 wherein said screens are angled at about 15 to about 25 degrees.

6. The method of claim 1 wherein said screens are angled so that said dislodged deposits fall downwardly without impacting on an adjacent screen.

7. The method of claim 1 wherein the dislodged deposits have a diameter from about 20 to about 1000 microns.

8. The method of claim 1 wherein said screens are spaced apart a distance from about 0.4 to about 2.0 cm.

9. The method of claim 8 wherein said screens are spaced apart from about 0.5 to about 1.5 cm.

10. The method of claim 1 wherein the dust agglomeration zone extends downwardly at an angle of about 10 to about 60 degrees and the mesh screens each stand vertically in the zone, whereby said screens are angled with respect to the axis of flow of the gas stream.

11. The method of claim 10 wherein said agglomeration zone extends downwardly at an angle of about 15 to about 25 degrees.

* * * * *